United States Patent
Whitney et al.

(10) Patent No.: US 9,365,204 B2
(45) Date of Patent: Jun. 14, 2016

(54) METHOD AND APPARATUS FOR TORQUE ARBITRATION AND SHAPING IN A MULTI-MODE POWERTRAIN SYSTEM

(71) Applicant: GM GLOBAL TECHNOLOGY OPERATIONS LLC, Detroit, MI (US)

(72) Inventors: Christopher E. Whitney, Commerce, MI (US); Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/103,921

(22) Filed: Dec. 12, 2013

(65) Prior Publication Data

US 2015/0166038 A1  Jun. 18, 2015

(51) Int. Cl.
*G06F 7/00* (2006.01)
*B60W 10/11* (2012.01)
*B60W 10/06* (2006.01)
*F02D 11/10* (2006.01)
*F02D 41/14* (2006.01)

(52) U.S. Cl.
CPC .............. *B60W 10/11* (2013.01); *B60W 10/06* (2013.01); *F02D 11/105* (2013.01); *F02D 2041/1412* (2013.01); *F02D 2250/21* (2013.01)

(58) Field of Classification Search
CPC .... B60W 10/11; B60W 10/06; F16H 61/0202
See application file for complete search history.

(56) References Cited

U.S. PATENT DOCUMENTS

| | | | |
|---|---|---|---|
| 8,406,970 B2 * | 3/2013 | Heap et al. | 701/54 |
| 8,818,660 B2 * | 8/2014 | Heap et al. | 701/54 |
| 2007/0213909 A1 * | 9/2007 | Doering et al. | 701/54 |
| 2014/0088803 A1 * | 3/2014 | Heap et al. | 701/22 |
| 2014/0288119 A1 * | 9/2014 | Breslow et al. | 514/311 |

* cited by examiner

*Primary Examiner* — David J Hlavka

(57) ABSTRACT

A method for operating a multi-mode powertrain system includes monitoring an operator request for tractive power, and arbitrating the operator request for tractive power with axle torque constraints and crankshaft torque constraints. An immediate tractive torque request and a predicted tractive torque request are determined based upon the arbitrated operator request for tractive power. The predicted tractive torque request is shaped based upon driveability torque constraints. Operation of torque-generative devices of the multi-mode powertrain system are controlled based upon the predicted tractive torque request and the driveability-shaped predicted tractive torque request.

16 Claims, 3 Drawing Sheets

METHOD AND APPARATUS FOR TORQUE ARBITRATION AND SHAPING IN A MULTI-MODE POWERTRAIN SYSTEM

TECHNICAL FIELD

This disclosure is related to control systems for multi-mode powertrain systems.

BACKGROUND

The statements in this section merely provide background information related to the present disclosure. Accordingly, such statements are not intended to constitute an admission of prior art.

Vehicles employ propulsion systems including multi-mode powertrain systems that generate and transfer tractive power to a driveline in response to an operator request, including tractive power for accelerating and braking. A propulsion system can experience an operator-discernible noise or clunk during a transition between a driven state and a non-driven state. This transition is known to occur when the operator request includes either an accelerator pedal tip-in or an accelerator pedal tip-out. A driven state occurs when the propulsion system generates positive torque to spin the driveline to propel the vehicle. A non-driven state occurs when the propulsion system is not generating positive torque, e.g., is reacting driveline torque and the vehicle momentum through the vehicle wheels is driving the propulsion system through the driveline. A transition from a driven state to a non-driven state can happen when the operator removes their foot from the accelerator pedal (tips out). A transition from a non-driven state to a driven state can happen when the operator applies their foot to the accelerator pedal (tips in). A lash zone exists in a gap between meshed gears in the transmission gearbox and driveline. When the propulsion system is in the driven state, the meshed gears are in contact and transfer torque on one gear face. When positive torque associated with the driven state is removed and the wheels start to drive the propulsion system, there is a point where the meshed gears transition across the lash zone to transfer torque on the other gear face. During the gear transition across the lash zone, the driveline can accelerate and impact the other gear face, generating the clunk.

SUMMARY

A method for operating a multi-mode powertrain system includes monitoring an operator request for tractive power, and arbitrating the operator request for tractive power with axle torque constraints and crankshaft torque constraints. An immediate tractive torque request and a predicted tractive torque request are determined based upon the arbitrated operator request for tractive power. The predicted tractive torque request is shaped based upon driveability torque constraints. Operation of torque-generative devices of the multi-mode powertrain system are controlled based upon the predicted tractive torque request and the driveability-shaped predicted tractive torque request.

BRIEF DESCRIPTION OF THE DRAWINGS

One or more embodiments will now be described, by way of example, with reference to the accompanying drawings, in which.

DETAILED DESCRIPTION

Figure 1:
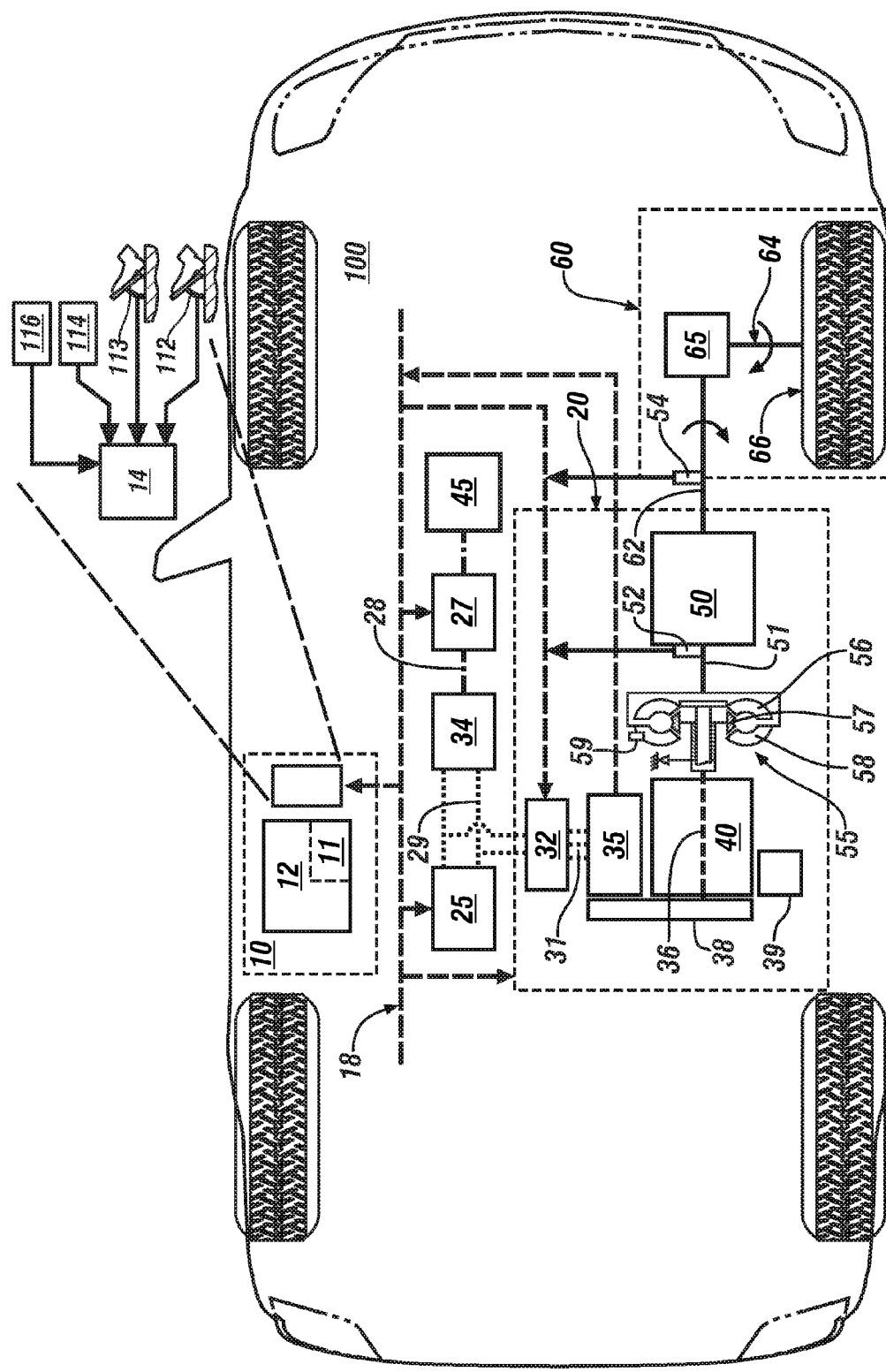
FIG. 1 illustrates a vehicle including a multi-mode powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a multi-mode powertrain system 20 coupled to a driveline 60 and controlled by a control system 10. Like numerals refer to like elements throughout the description. The multi-mode powertrain system 20 includes torque-generative devices including an internal combustion engine 40 and a non-combustion torque machine 35 that are capable of generating and reacting torque that is transferred to a driveline 60 via a transmission 50. One configuration of the multi-mode powertrain system 20 includes the torque machine 35 rotatably mechanically coupled to a crankshaft 36 of the engine 40 that rotatably mechanically couples through a fluidic torque coupling device (torque converter) 55 to an input member 51 of the transmission 50. As shown, the crankshaft 36 mechanically rotatably couples to the torque machine 35 via a pulley mechanism 38. Other configurations of the multi-mode powertrain system 20 that include the torque machine 35 rotatably mechanically coupled to the engine 40 that mechanically couples to the transmission 50 may be employed within the scope of this disclosure.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form a combustion charge to produce torque that is responsive to an operator request for vehicle propulsion. The engine actuators include slow actuators and fast actuators. A fast engine actuator is an actuator that completes a change in engine operation, e.g., engine torque output that is responsive to a change in a command to the engine actuator within a single engine cylinder event. One example of a fast engine actuator is spark ignition timing A slow engine actuator is an actuator that completes a change in engine operation, e.g., engine torque output that responsive to a change in a command to the engine actuator only after a delay of more than a single engine cylinder event. One example of a slow engine actuator is electronic throttle control (ETC). The engine can take 100 to 500 ms to effect a change in engine torque output in response to a change in the ETC due to latencies associated with intake manifold fill times and other factors. The engine 40 is configured to execute autostart and autostop control schemes and fuel cutoff (FCO) control schemes during ongoing operation of the multi-mode powertrain system 20. The engine 40 is considered to be in an OFF state when it is not rotating. The engine 40 is considered to be in an ON state when it is rotating, including one or more FCO states in which it is spinning and unfueled.

The non-combustion torque machine 35 is an electrically-powered torque machine 35 that includes a high-voltage multi-phase electric motor/generator electrically connected to an inverter module 32. The torque machine 35 includes a rotor and a stator and an accompanying position sensor. The torque machine 35 in concert with the inverter module 32 is operable to convert stored electric energy to mechanical power and convert mechanical power to electric energy. The inverter module 32 includes fast actuators, which are able to complete a change in operation of the torque machine 35, e.g., torque output or speed output that is responsive to a change in a command to the engine actuator within an amount of time corresponding to a single engine cylinder event, i.e., within 10-20 msec. One example of a fast actuator for the torque machine is a power transistor. The inverter module 32 acts as a fast actuator to control the torque machine 35. The electric energy may be consumed or stored in a high-voltage battery 25 in one embodiment.

In one embodiment, the electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including torque transfer from the torque machine 35 to the engine 40 for engine autostart and autostop maneuvers, tractive torque assistance, torque transfer for regenerative vehicle braking, and torque transfer from engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or another suitable positive mechanical connection. The engine 40 may include a low-voltage solenoid-actuated electrical starter 39 for engine starting in response to a key-crank event in one embodiment.

The high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including the power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque in response to motor torque commands. Similarly, the inverter module 32 converts mechanical power transferred to the torque machine 35 to DC electric power to generate electric energy that is storable in the high-voltage battery 25 in response to motor control commands, including as part of a regenerative control strategy. The inverter module 32 is configured to control the power transistors to provide the motor drive and regeneration functionality in response to the motor control commands. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 45 to provide low-voltage electric power to low-voltage systems on the vehicle, including, e.g., electric windows, HVAC fans, seats, and the low-voltage solenoid-actuated electrical starter 39.

The transmission 50 is configured to operate in one of a plurality of selectable fixed-gear operating modes to operate at a gear ratio that achieves a preferred match between the operator request for propulsion and an engine operating point, and preferably employs one or a plurality of differential gear sets and hydraulically-activated clutches to effect torque transfer in one of a plurality of selectable operating modes over a range of speed ratios between the input member 51 and output member 62. Exemplary transmissions include, by way of example, an automatic transmission, a dual clutch transmission, a clutchless manual transmission and a manual transmission. The transmission 50 executes upshifts to shift to an operating mode having a lower numerical multiplication ratio (gear ratio) and executes downshifts to shift to an operating mode having a higher numerical multiplication ratio in response to output torque requests. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. Alternatively, the transmission 50 may be configured as a continuously variable transmission. The transmission preferably includes a first rotational position/speed sensor 52 to monitor rotation of the input member 51 and a second rotational position/speed sensor 54 to monitor rotation of the output member 53 of the transmission 50. As such, the first rotational position/speed sensor 52 also may be used to monitor rotational speed of a turbine of the torque converter 55.

The torque converter 55 is a two-pass fluidic torque coupling device in one embodiment that includes an impeller, a stator, turbine, and a controllable locking clutch. The controllable locking clutch is configured to operate in one of an unlocked state, a controlled slip state, and a locked state to manage relative rotation of the impeller and the turbine. The design features of a torque converter are known and not discussed in detail herein. Alternatively, the torque converter 55 can be a three-pass device. The torque converter 55 operates as an automatic clutch element to transfer torque between the engine 40 and the transmission 50. The torque converter 55 provides a mechanical buffer between the engine 40 and the transmission 50, acting to absorb torsional vibrations of the engine 40, transmission 50, and driveline 60. The torque converter 55 may also act to dampen variations in the engine speed under certain conditions including those associated with engine speed flaring during engine starting events and individual cylinder firing events at low engine speeds.

The driveline 60 may include a differential gear device 65 that mechanically couples to an axle 64, transaxle or half-shaft that mechanically couples to a wheel 66 in one embodiment. The driveline 60 transfers tractive power between the transmission 50 and a road surface.

The control system 10 includes control module 12 that signally connects to an operator interface 14. The control module 12 preferably includes a plurality of discrete devices that are co-located with the individual elements of the multi-mode powertrain system 20 to effect operational control of the individual elements of the multi-mode powertrain system 20. The control module 12 may also include a control device that provides hierarchical control of other control devices. The control module 12 signally and operatively connects to each of the high-voltage battery 25, the inverter module 32, the torque machine 35, the engine 40, and the transmission 50 either directly or via a communications bus 18 to monitor operation and determine parametric states thereof. The operator interface 14 of the vehicle 100 is a controller that signally connects to a plurality of human/machine interface devices through which a vehicle operator inputs various operator requests for propulsion or tractive power and other requests for operation of the vehicle 100. The human/machine interface devices are devices that monitor and evaluate the operator requests for tractive power including, e.g., an accelerator pedal 112, which provides an operator requested acceleration signal (APP); a brake pedal 113, which provides an operator requested braking signal (BPP); a transmission range selector 114, which provides an operator requested transmission range signal (PRNDL); and a vehicle speed cruise control system 116, which provides an operator request for vehicle speed (CRUISE). Other human/machine interface devices preferably include an ignition switch to enable an operator to initiate vehicle operation, including cranking and starting the engine 40, a steering wheel, and a headlamp switch. The transmission range selector 114 provides signal input indicating direction of operator-requested motion of the vehicle including a discrete number of operator-selectable positions indicating the preferred rotational direction of the output member 62 of either a forward or a reverse direction. It is appreciated that the vehicle may still move in a direction other than the indicated direction of operator-requested motion due to rollback caused by location of a vehicle, e.g., on a hill.

The multi-mode powertrain system 20 includes a communications scheme including the communications bus 18 to effect communications in the form of sensor signals and actuator command signals between the control system 10 and elements of the multi-mode powertrain system 20. The communications scheme employs one or more communications systems and devices, including, e.g., the communications bus 18, a direct connection, a local area network bus, a serial peripheral interface bus, and wireless communications to effect information transfer.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Vehicle operation responsive to the operator requests for tractive power includes operating modes of accelerating, braking, coasting, and idling. The acceleration mode includes an operator request to generate tractive power to increase vehicle speed. The braking mode includes an operator request to generate tractive power to decrease vehicle speed, which can be accomplished with braking torque that originates from either or both friction braking from mechanical brake elements that are located at the vehicle wheels and reactive braking from the powertrain system through the driveline. The coasting mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal. Operating an embodiment of the powertrain system 20 described with reference to FIG. 1 includes monitoring the operator requests for tractive power, wherein the operator request includes inputs from the accelerator pedal, the brake pedal, the cruise control system, and the transmission range selector. Such operator requests may include zero states such as when braking is not applied.

Figure 2:
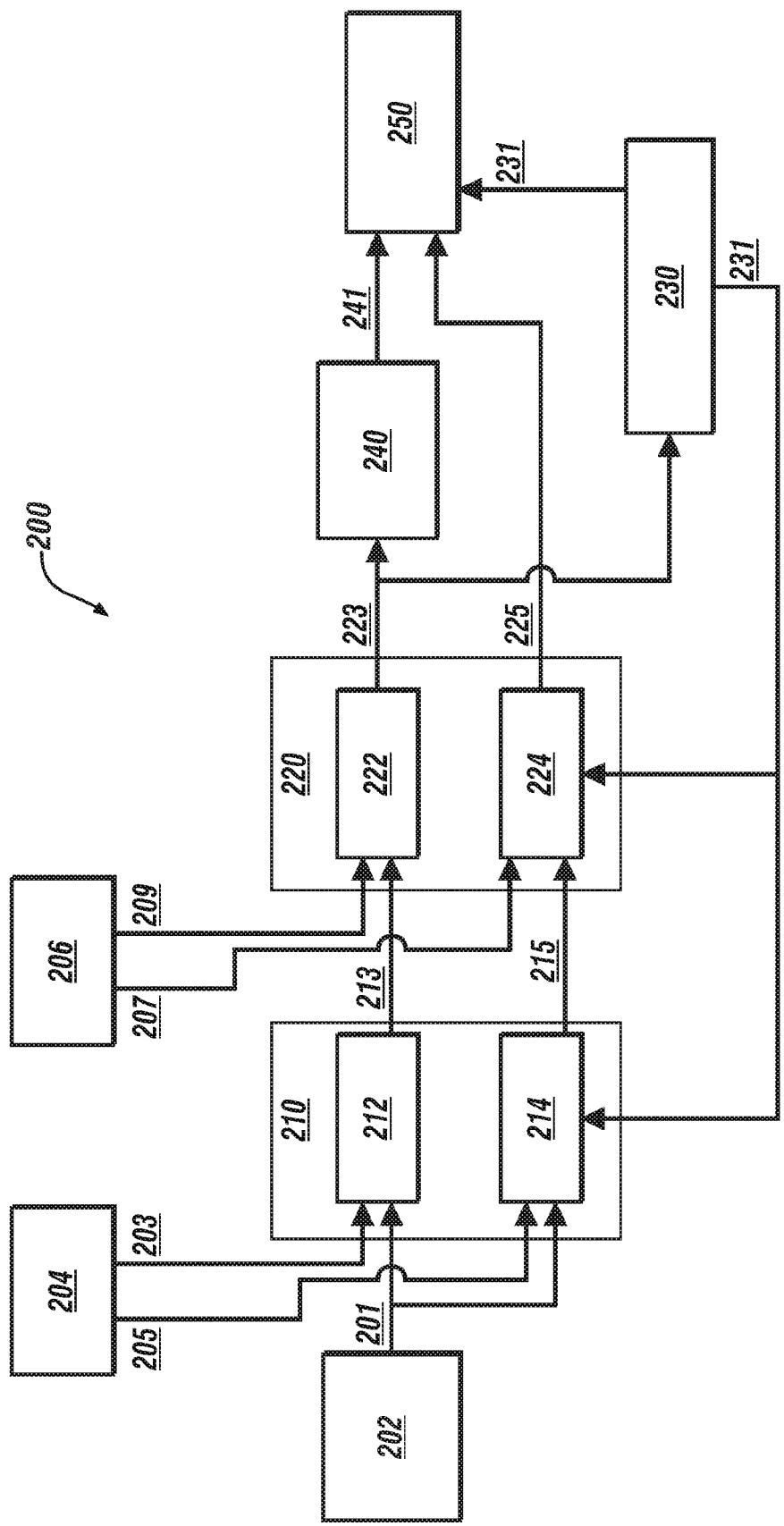
FIG. 2 illustrates a torque arbitration and shaping control scheme (control scheme) employed to operate the powertrain system of FIG. 1 responsive to an operator request for tractive power, in accordance with the disclosure.

FIG. 2 schematically shows a torque arbitration and shaping control scheme (control scheme) 200 that is employed to operate the powertrain system 100 of FIG. 1 in response to the operator requests for tractive power, which may be a single one of or a combination of the operator inputs from the accelerator pedal, the brake pedal, the cruise control system, and the transmission range selector. The control scheme 200 executes to determine predicted and immediate torque commands for controlling the slow actuators and the fast actuators of the internal combustion engine and the torque machine responsive to the operator requests for tractive torque. FIG. 2 shows torque arbitration related to a predicted torque request and torque arbitration related to an immediate torque request, including a path that yields immediate torque request elements 205, 215 and 225. When there are no torque intervention requests, the immediate path is inactive. The predicted path includes predicted torque request elements 201, 203, 213 and 223. The predicted paths 201, 213 and 223 are always active. Predicted constraints 203 and 209, which are intervention constraints described herein, can be either active or inactive. Thus, an operator request for tractive power emerges from a driveability torque shaping as a raw unshaped request. The output of a drivability torque shaping scheme 230 is employed by the engine and motor torque execution to control the powertrain system.

An immediate torque command is a torque command to one or more of the torque-generative devices that is immediately implemented. Actual achieved torque may vary from the immediate torque command due to system and component responses and lag times associated with mechanical inertia, airflow and manifold fill times, response times of high-voltage switches, electro-magnetic flux, and other uncompensated factors for a torque-generative device. A predicted torque command is a torque command to one or more of the torque-generative devices that is made with an expectation that torque production by the torque-generative device will be achieved in a filtered, smooth fashion within a reasonable (<500 ms) timeframe with minimum fuel consumption. A predicted torque command may include compensation for a projected change in the required torque associated with a pending change in powertrain operations such as gear shifting, execution of an engine autostop or autostart operation, or another operation. A predicted torque command is projected over an extended timeframe responsive to the output torque request and excludes allowance for system and component responses and lag times associated with mechanical inertia, airflow and manifold fill-time lags, response times of high-voltage switches, electro-magnetic flux, and other factors. Thus, an immediate torque command and a predicted torque command are substantially the same magnitude under steady-state conditions. A predicted torque command deviates from an immediate torque command under operating conditions that indicate a pending change in vehicle operations requiring a change in system torque such as executing gear shifting or executing either an engine autostop or an engine autostart operation, wherein the system prepares for and accommodates system and component responses and lag times to achieve a forthcoming operating state and/or operating condition.

The control scheme 200 coordinates torque limitations associated with a driveability torque shaping scheme and torque limitations associated axle torque and crankshaft torque arbitration schemes to determine predicted and immediate torque commands for operating the engine and torque machine of the powertrain system responsive to the operator request for tractive power. In execution, the operator request for tractive power is subjected to axle torque arbitration and crankshaft torque arbitration prior to executing torque optimization. The arbitrated operator requests are subjected to driveability torque shaping, which is preferably provided as feedback in a closed-loop system to the axle torque and crankshaft torque arbitration schemes. Engine and torque machine torque commands are determined based upon the operator request for tractive power that has been subject to torque arbitration and torque shaping.

A torque interpretation scheme 202 forms the operator request for tractive power 201 based upon a compilation and evaluation of the APP, BPP, CRUISE and PRNDL inputs from the accelerator pedal, the brake pedal, the cruise control system and the transmission range selector, respectively, in conjunction with other inputs. The operator request for tractive power 201 is preferably a single numeric value that is regularly and ongoingly determined at all times during vehicle operation.

Constraint inputs include axle torque intervention requests 204 and crankshaft torque intervention requests 206. The torque intervention requests include torque decrease intervention requests and torque increase intervention requests. A torque decrease intervention request is a request that may decrease torque to a value that is less than the operator request for tractive power 201. Such a request can be active or inactive. It is called an intervention because it may supersede the operator request for tractive power and is not the norm. Some examples of a torque decrease intervention request include a traction control intervention, wherein a brake controller requests a torque that is less than an operator command to reduce speed of the driven wheels to meet road surface friction, a transmission upshift torque management request to decrease engine torque to decrease engine speed to execute an upshift to a higher gear, vehicle overspeed protection, and engine overspeed protection. A torque increase intervention request is a request that may increase torque to a value that is greater than the operator request for tractive power 201. Such a request can be active or inactive. It is called an intervention because it may supersede the operator request for tractive power and is not the norm. Some examples of torque increase intervention requests include a drag control intervention request wherein a braking controller requests a torque that is greater than an operator command to increase the speed of the driven wheels to meet the road surface friction and transmission tap downshift torque management to increase engine torque to increase engine speed to shift to a lower gear. Because torque increase intervention requests are seeking to increase torque above the operator request, torque security schemes are employed to prevent unintended acceleration.

Constraint schemes include an axle torque arbitration scheme 210, a crankshaft torque arbitration scheme 220, and the driveability torque shaping scheme 230.

The axle torque arbitration scheme 210 arbitrates the operator request for tractive power 201 against a predicted axle torque constraint 203 and an immediate axle torque constraint 205 that originate from an axle torque intervention scheme 204. The axle torque intervention scheme 204 determines constraints to minimize or otherwise control vehicle wheel slip, including traction/drag control. The crankshaft torque intervention scheme 206 includes engine operating constraints to protect engine hardware and/or control the engine when the driveline is decoupled therefrom. Such constraints include engine overspeed constraints, power takeoff constraints, engine torque/clutch disengagement constraints, engine constraints with the torque converter clutch in an unlocked state, engine constraints with the transmission in Park or Neutral, and engine constraints during transmission shifting events.

The axle torque arbitration scheme 210 includes a first arbitrator 212 that arbitrates between the operator request for tractive power 201 and the predicted axle torque constraint 203 to determine a first predicted tractive torque request 213.

Arbitrating between the operator request for tractive power 201 and the predicted axle torque constraint 203 includes selecting the operator request for tractive power 201 as the first predicted tractive torque request 213 so long as the operator request for tractive power 201 is less than the predicted axle torque constraint 203, and selecting the predicted axle torque constraint 203 as the first predicted tractive torque request 215 when the operator request for tractive power 201 is equal to or greater than the predicted axle torque constraint 203 when the predicted axle torque constraint 203 is active and requesting a torque decrease. Similarly, arbitrating between the operator request for tractive power 201 and the predicted axle torque constraint 203 includes selecting the predicted axle torque constraint 203 as the first predicted tractive torque request 213 so long as the operator request for tractive power 201 is greater than the predicted axle torque constraint 203, and selecting the operator request for tractive power 201 as the first predicted tractive torque request 213 when the operator request for tractive power 201 is equal to or greater than the predicted axle torque constraint 203 when the predicted axle torque constraint 203 is active and requesting a torque increase.

The axle torque arbitration scheme 210 includes a second arbitrator 214 that arbitrates between the operator request for tractive power 201 and the immediate axle torque constraint 205 to determine a first immediate tractive torque request 215, including incorporating driveability torque constraint 231. Arbitrating between the operator request for tractive power 201, the immediate axle torque constraint 205 and the driveability torque constraint 231 includes setting the first immediate tractive torque request 215 as inactive when the immediate axle torque constraint 205 is greater than the driveability torque constraint 231 and the first immediate tractive torque request 215 is requesting a torque decrease. Arbitrating between the operator request for tractive power 201, the immediate axle torque constraint 205 and the driveability torque constraint 231 includes setting the first immediate tractive torque request 215 as active and equal to the immediate axle torque constraint 205 when the immediate axle torque constraint 205 is less than the driveability torque constraint 231 and the immediate axle torque constraint 205 is requesting a torque decrease.

The crankshaft torque arbitration scheme 220 employs a predicted crankshaft torque constraint 209 and an immediate crankshaft torque constraint 207 that originate from the crankshaft torque intervention scheme 206. The crankshaft torque arbitration scheme 220 includes a first arbitrator 222 that arbitrates between the first arbitrated predicted tractive torque request 213 and the predicted crankshaft torque constraint 209 to determine a final predicted tractive torque request 223.

Arbitrating between the first arbitrated predicted tractive torque request 213 and the predicted crankshaft torque constraint 209 includes selecting the predicted tractive torque request 213 as the final predicted tractive torque request 223 so long as the predicted tractive torque request 213 is less than the predicted crankshaft torque constraint 209, and selecting the predicted crankshaft torque constraint 209 as the final predicted tractive torque request 223 when the predicted tractive torque request 213 is equal to or greater than the predicted crankshaft torque constraint 209 when the predicted crankshaft torque constraint 209 is active and requesting a torque decrease.

Arbitrating between the first arbitrated predicted tractive torque request 213 and the predicted crankshaft torque constraint 209 includes selecting the predicted crankshaft torque constraint 209 as the final predicted tractive torque request 223 so long as the predicted tractive torque request 213 is greater than the predicted crankshaft torque constraint 209, and selecting the first arbitrated predicted tractive torque request 213 as the final predicted tractive torque request 223 when the predicted tractive torque request 213 is less than the predicted crankshaft torque constraint 209 when the predicted crankshaft torque constraint 209 is active and requesting a torque increase.

The crankshaft torque arbitration scheme 220 includes a second arbitrator 224 that arbitrates between the immediate crankshaft torque constraint 207, the first immediate tractive torque request 215, and the driveability torque constraint 231. When the first immediate tractive torque request 215 is inactive, then the driveability torque constraint 231 is used as the final immediate tractive torque request 225. If the first immediate tractive torque request 215 is active, the final immediate tractive torque request 225 is not used. If immediate crankshaft torque constraint 207 is active and requesting a decrease and it is below the axle path (formed with 215 and 231), then immediate crankshaft torque constraint 207 wins. If the immediate crankshaft torque constraint 207 is active and requesting a torque decrease, the axle path is selected. If the first immediate tractive torque request 215 is inactive and this happens, the final immediate tractive torque request 225 is inactive because there was no request that went below the natural response of the predicted request 231. If immediate crankshaft torque constraint 207 is active and requesting a torque increase and it is above the axle path (formed with 215 and 231) then the immediate crankshaft torque constraint 207 is selected. If it is active and requesting a torque increase and is below the axle path, the axle path wins. This includes selecting the first immediate tractive torque request 215 as the final immediate tractive torque request 225 so long as the first immediate tractive torque request 215 is less than the immediate crankshaft torque constraint 207, and selecting the immediate crankshaft torque constraint 207 as the final immediate tractive torque request 225 when the first immediate tractive torque request 215 is equal to or greater than the immediate crankshaft torque constraint 207.

The final predicted tractive torque request 223 is employed in a torque-split optimization scheme 240 that determines preferred torque commands 241 for controlling the engine and the torque machine in response to the final predicted tractive torque request 223. The torque-split optimization scheme evaluates operating factors including present torque outputs from the engine and the torque machine, minimum and maximum torque capabilities of the engine and the torque machine, torque capabilities associated with battery power limits, system inertias and response times, and other factors to determine the preferred torque split between the engine and the torque machine to respond to the final predicted tractive torque request 223. The final predicted tractive torque request 223 is also input to the driveability torque shaping scheme 230, which determines driveability torque constraints 231 based upon issues related to driveability, including limiting or otherwise controlling a time-rate change in the torque responsive to a torque request that effects a smooth torque transition.

The driveability torque constraints 231 are provided as feedback to the axle torque arbitration scheme 210 to arbitrate with the immediate axle torque constraint 205 and to the crankshaft torque arbitration scheme 220 to arbitrate with the immediate crankshaft torque constraint 207. The driveability torque shaping generates the driveability torque constraints 231 based upon issues related to driveability, including clunk zone management or lash zone management. Clunk zone management is performed when the propulsion system and driveline transitions between a driven state and a non-driven state. The driven state occurs when the propulsion system provides positive torque and is winding the drive line up in a positive torque direction. The non-driven state occurs is when the propulsion system is consuming torque (negative absolute torque) and the wheels are driving the propulsion system through the driveline. A transition from the driven state to the non-driven state happens when the operator removes their foot from the accelerator pedal in a tip-out maneuver. A similar transition occurs when the operator presses on the accelerator pedal in a tip-in maneuver.

When the propulsion system is in the driven state, driveline meshed gears, e.g., in the transmission gearbox and in the driveline are in contact on one side. When the propulsion torque is removed and the vehicle momentum begins to drive the propulsion system, torque transfer in the meshed gears changes direction with gear lash between the meshed gears being taken up leading to collision of the gears causing an operator-discernible noise and bump, often referred to as clunk. To mitigate clunk, the driveability torque shaping scheme 230 includes a clunk zone management function that imposes a constraint that includes a maximum limit on the time-rate of change of the axle torque request when the powertrain system is operating in the lash zone, which is centered at 0 Nm of axle torque with some allowance for error. Requirements associated with clunk zone management including ensuring the propulsion system is responsive to the vehicle operator, including minimizing operation in the lash zone to prevent an unacceptable delay in response to a change in the accelerator pedal request.

The final immediate tractive torque request 225, the final predicted tractive torque request 223, and the driveability torque command 231 are input to a torque command scheme 250 to control operation of the torque machine and the internal combustion engine. An internal combustion engine has air transport lags and other response elements that assist in achieving smooth torque transitions. Fast-response actuators such as electric motors employ the torque commands including predictive torque commands to manage torque commands to achieve smooth torque transitions.

The predicted torque request is employed to control engine airflow, fuel cut off, spark retard, and torque output from the electric motor to deliver a normal filtered-like delay in response to the predicted crankshaft torque request. The immediate torque request is employed to control torque output from the electric motor and engine spark retard when torque output from the torque machine approaches a minimum or maximum torque limit. The torque shaping is calibrated into the predicted torque path for clunk zone management.

The torque command scheme 250 controls operation of the torque-generative devices of the multi-mode powertrain system responsive to the predicted tractive torque request 223 and the immediate tractive torque request 225 that has been shaped by the driveability torque constraints 231, taking into account the preferred torque commands 241 for controlling the engine and the torque machine in response to the predicted tractive torque request 223.

Executing the torque arbitration and shaping control scheme (control scheme) 200 as described provides effective implementation of driveability torque shaping in conjunction with hybrid optimization with torque arbitration to effect interventions where needed during ongoing vehicle operation.

Figure 3:
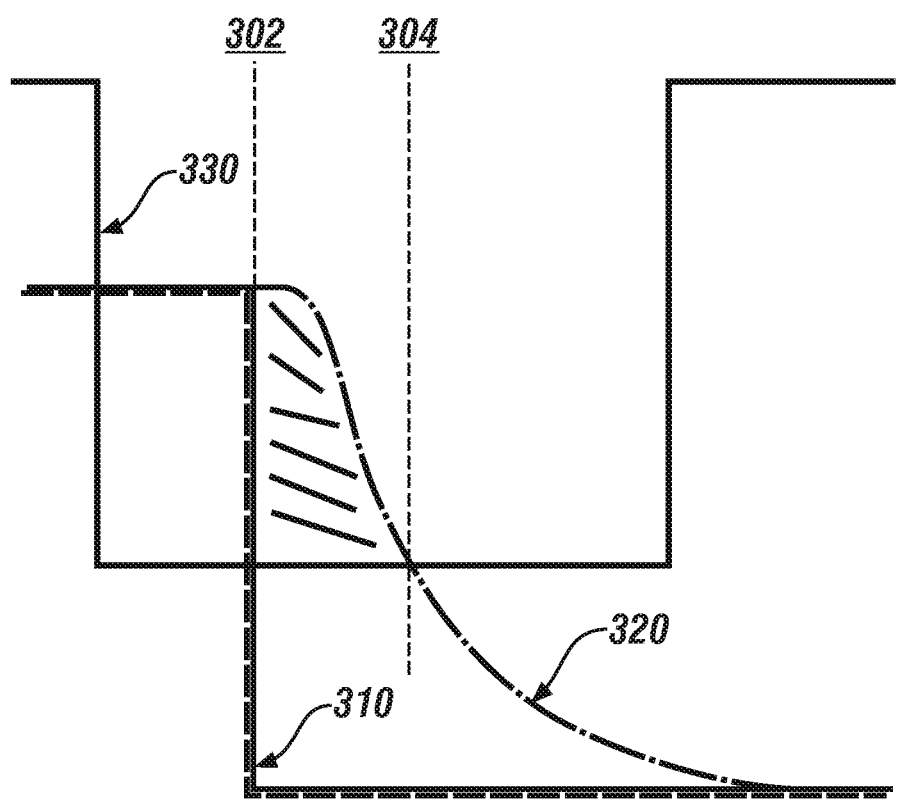
FIG. 3 illustrates states of operating parameters related to operation of a vehicle including a raw operator request for tractive power and a driveability-shaped immediate operator torque request, in accordance with the disclosure.

FIG. 3 graphically shows states of operating parameters related to operation of a vehicle, e.g., as described with reference to FIG. 1, including a raw operator request for tractive power 310 and a shaped immediate operator torque request 320, i.e., one that has been shaped by the driveability torque constraints, in relation to time, which is in the horizontal dimension. A transmission immediate torque reduction request 330 is also shown, and occurs prior to time 302. Time 302 indicates occurrence of an operator tip-out. During the period between time 302 and time 304, when the magnitude of the shaped immediate operator torque request 320 becomes less than the transmission immediate torque reduction request 330, the arbitration process arbitrates between the shaped immediate operator torque request 320 and the transmission immediate torque reduction request 330, thus permitting a shaped smooth transition in the torque request that is employed to control the powertrain system instead of a step decrease transition in the torque request. Thus, when the shaped immediate operator torque request 320 becomes less than the immediate torque reduction request 330, the immediate torque request 330 becomes active and the system employs the driveability torque constraints, i.e., the shaped immediate operator torque request 320 to control torque in the powertrain system. Thus, there is a driveability benefit to having the immediate torque request path stay active by executing the torque shaping after torque arbitration during the period described.

Executing torque shaping in such a manner allows the control system to make better decisions for fuel economy. For example, on a tip-out, the predicted crankshaft torque command reduces and the control system can quickly execute engine dFCO operation and employ the torque machine to assist to crossing the lash zone. The control system can employ active damping systems for manual transmission systems with rapid access to the control the torque machine without going through extra serial data busses. The control system shapes the predicted crankshaft torque request and sends it to an engine controller to use in torque arbitration.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a multi-mode powertrain system, comprising:
   within a control module;
      monitoring an operator request for tractive power;
      arbitrating the operator request for tractive power with axle torque constraints and crankshaft torque constraints;
      determining an immediate tractive torque request and a predicted tractive torque request based upon the arbitrated operator request for tractive power;
      shaping the predicted tractive torque request based upon driveability torque constraints; and
      controlling operation of torque-generative devices of the multi-mode powertrain system including operating the torque-generative devices at a torque command based upon the predicted tractive torque request and the driveability-shaped predicted tractive torque request.

2. The method of claim 1, wherein controlling operation of torque-generative devices of the multi-mode powertrain system including operating the torque-generative devices at the torque command based upon the predicted tractive torque request and the driveability-shaped predicted tractive torque request is effected when the immediate tractive torque request is inactive.

3. The method of claim 1, further comprising controlling operation of the torque-generative devices including operating the torque-generative devices at the torque command based upon the predicted tractive torque request and the immediate tractive torque request when the immediate tractive torque request is active.

4. The method of claim 1, wherein determining the immediate tractive torque request based upon the arbitrated operator request for tractive power comprises determining the torque command for immediate execution by the torque-generative devices.

5. The method of claim 1, wherein determining the predicted tractive torque request based upon the arbitrated operator request for tractive power comprises determining the torque command based upon a determination of a required torque output for one of the torque-generative devices occurring in a near-term operation of the powertrain system.

6. The method of claim 1, wherein controlling operation of torque-generative devices of the multi-mode powertrain system including operating the torque-generative devices at the torque command based upon the predicted tractive torque request and the shaped predicted tractive torque request comprises controlling operation of an internal combustion engine including operating the internal combustion engine at the torque command based upon the predicted tractive torque request and the shaped predicted tractive torque request.

7. The method of claim 1, wherein controlling operation of torque-generative devices of the multi-mode powertrain system including operating the torque-generative devices at the torque command based upon the predicted tractive torque request and the shaped predicted tractive torque request comprises controlling operation of a non-combustion torque machine based upon the shaped predicted tractive torque request.

8. The method of claim 1, wherein shaping the predicted tractive torque request based upon driveability torque constraints comprises imposing a maximum limit on a time-rate of change of the immediate tractive torque request when the multi-mode powertrain system is operating in a driveline lash zone centered around 0 Nm of axle torque.

9. The method of claim 1, wherein arbitrating the operator request for tractive power with axle torque constraints comprises arbitrating the operator request for tractive power with an axle torque decrease intervention request and an axle torque increase intervention request.

10. The method of claim 9, wherein arbitrating the operator request for tractive power with an axle torque decrease intervention request comprises arbitrating the operator request for tractive power with a traction control intervention request.

11. The method of claim 9, wherein arbitrating the operator request for tractive power with an axle torque increase intervention request comprises arbitrating the operator request for tractive power with a drag control intervention request.

12. The method of claim 1, wherein arbitrating the operator request for tractive power with crankshaft torque constraints comprises arbitrating the operator request for tractive power with a crankshaft torque decrease intervention request and a crankshaft torque increase intervention request.

13. The method of claim 12, wherein arbitrating the operator request for tractive power with a crankshaft torque decrease intervention request comprises arbitrating the operator request for tractive power with a request to decrease engine torque to decrease engine speed to execute an upshift to a higher gear.

14. The method of claim 12, wherein arbitrating the operator request for tractive power with a crankshaft torque increase intervention request comprises arbitrating the operator request for tractive power with a request to increase engine torque to increase engine speed to shift to a lower gear.

15. The method of claim 1, wherein arbitrating the operator request for tractive power further comprises arbitrating the operator request for tractive power with the driveability torque constraints.

16. Method for operating a series-hybrid powertrain system, comprising:
    within a control module;
        monitoring an operator request for tractive power;
        arbitrating the operator request for tractive power with constraints including an axle torque intervention request and a crankshaft torque intervention request;
        determining an immediate tractive torque request and a predicted tractive torque request based upon the arbitrated operator request for tractive power;
        shaping the predicted tractive torque request based upon driveability torque constraints;
        controlling operation of torque-generative devices of the series-hybrid powertrain system based upon the predicted tractive torque request and the driveability-shaped predicted tractive torque request when the immediate tractive torque request is in an inactive state; and
        controlling operation of the torque-generative devices including operating the torque-generative devices at a torque command based upon the predicted tractive torque request and the immediate tractive torque request when the immediate tractive torque request is in an active state.

* * * * *